(12) United States Patent
Hsu et al.

(10) Patent No.: US 8,071,900 B2
(45) Date of Patent: Dec. 6, 2011

(54) KEYBOARD WITH LIGHTING SYSTEM

(75) Inventors: Chih-Peng Hsu, HsinChu (TW); Chung-Min Chang, HsinChu (TW); Tung-An Chen, HsinChu (TW); Tse-An Lee, HsinChu (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 350 days.

(21) Appl. No.: 12/477,925

(22) Filed: Jun. 4, 2009

(65) Prior Publication Data
US 2009/0308722 A1 Dec. 17, 2009

(30) Foreign Application Priority Data
Jun. 11, 2008 (CN) .......................... 2008 1 0302108

(51) Int. Cl.
*H01H 9/00* (2006.01)
*G01D 11/28* (2006.01)

(52) U.S. Cl. .............................. 200/314; 362/23; 362/29

(58) Field of Classification Search .......... 200/310–314, 200/317; 362/23, 29, 30, 85, 36, 249.09, 362/183
See application file for complete search history.

(56) References Cited

U.S. PATENT DOCUMENTS

| | | | |
|---|---|---|---|
| 4,449,024 A * | 5/1984 | Stracener ...................... | 200/317 |
| 5,708,428 A * | 1/1998 | Phillips ......................... | 200/314 |
| 5,975,711 A * | 11/1999 | Parker et al. .................... | 362/24 |
| 6,179,432 B1 * | 1/2001 | Zhang et al. .................... | 362/84 |
| 6,217,183 B1 * | 4/2001 | Shipman ........................ | 362/30 |
| 6,609,805 B1 * | 8/2003 | Nelson ........................... | 362/30 |
| 7,172,303 B2 * | 2/2007 | Shipman et al. ................ | 362/29 |
| 7,193,535 B2 * | 3/2007 | Shipman ........................ | 362/30 |
| 7,214,897 B2 * | 5/2007 | Chuang ......................... | 200/317 |
| 7,283,066 B2 * | 10/2007 | Shipman ........................ | 362/30 |
| 7,335,843 B2 * | 2/2008 | Chan et al. .................... | 200/310 |
| 7,531,764 B1 * | 5/2009 | Lev et al. ...................... | 200/310 |
| 7,588,338 B2 * | 9/2009 | Chou ............................ | 200/314 |
| 7,628,500 B2 * | 12/2009 | Chou ............................ | 200/314 |
| 7,712,920 B1 * | 5/2010 | Hsieh ....................... | 362/249.02 |
| 7,883,227 B1 * | 2/2011 | Katrinecz et al. ............... | 362/85 |

FOREIGN PATENT DOCUMENTS
CN 2611977 Y 4/2004
* cited by examiner

*Primary Examiner* — Briggitte R Hammond
(74) *Attorney, Agent, or Firm* — Altis Law Group, Inc.

(57) ABSTRACT

An exemplary keyboard is provided. The keyboard includes a light pervious base plate, a plurality of input keys, and at least one light source. The light pervious base plate has a top surface. The plurality of input keys are disposed on the light pervious base plate with bottom sides of the input keys facing the top surface of the light pervious base plate. The at least one light source is encapsulated in the light pervious base plate and optically coupled to the light pervious panel.

17 Claims, 3 Drawing Sheets

KEYBOARD WITH LIGHTING SYSTEM

BACKGROUND

1. Technical Field

The present invention relates to keyboards, and particularly to a keyboard having a lighting system used in conjunction with a computer system.

2. Description of Related Art

A keyboard is commonly used in conjunction with a computer as an input device. Keyboards usually have a plurality of keycaps wherein alphanumeric symbols (or symbols in foreign languages) are printed on the keycaps to help users select the desired input to the computer. Under normal condition, such as under a brightly lit environment, the users typically can clearly identify the symbols on the keycaps. However, in a dark environment or in a low ambient light condition, the symbols on the keycaps may not be clearly visible to the users.

Therefore, a keyboard with a lighting system is desirable to overcome the above-described deficiencies.

BRIEF DESCRIPTION OF THE DRAWINGS

Many aspects of various preferred and exemplary embodiments can be better understood with reference to the following drawings. The components in the drawings are not necessarily drawn to scale, the emphasis instead being placed upon clearly illustrating the principles of the embodiments. Moreover, in the drawings, all the views are schematic, and like reference numerals designate corresponding parts throughout the several views.

DETAILED DESCRIPTION

Embodiments will now be described in detail below, with reference to the drawings.

Figure 1:
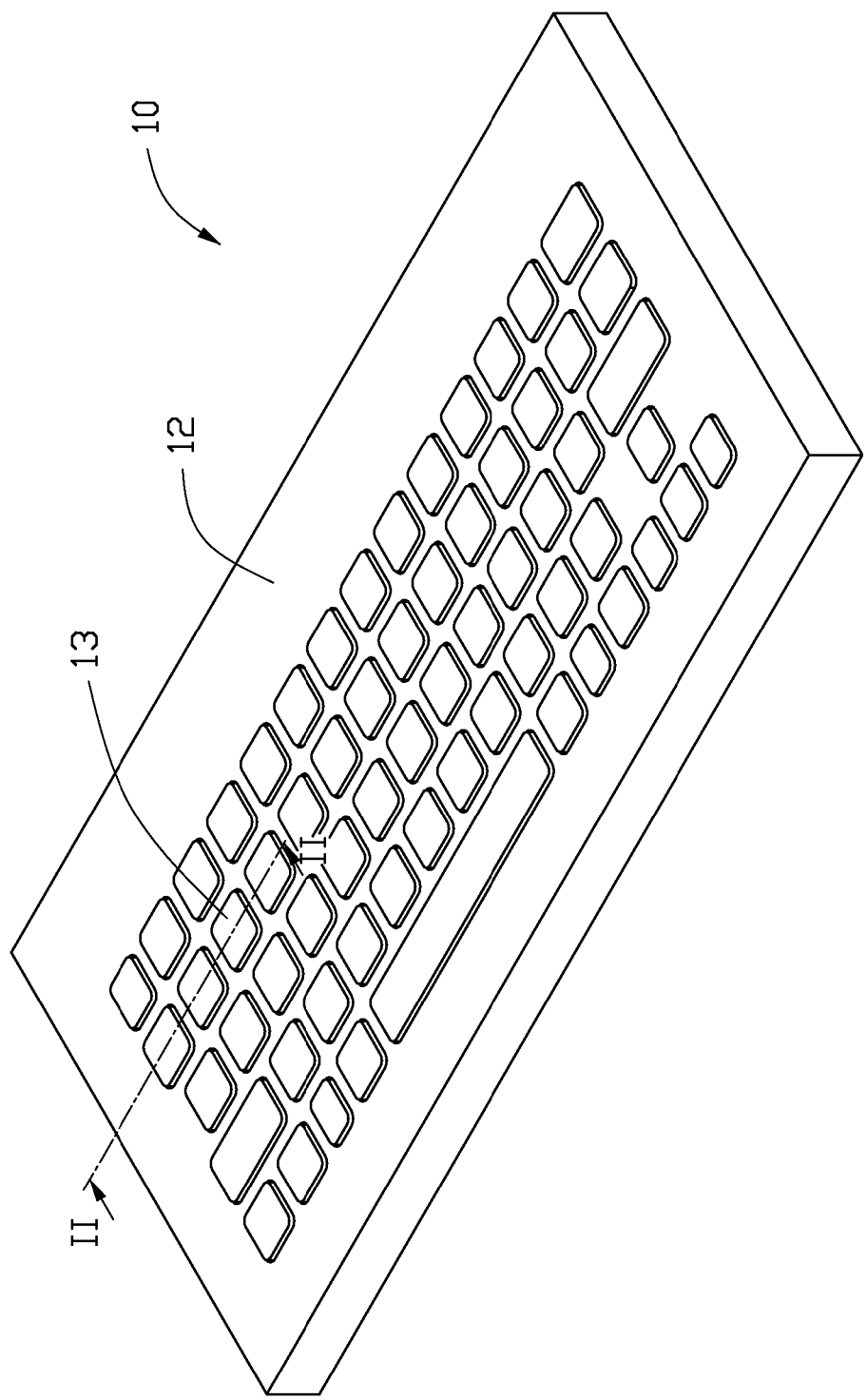
FIG. 1 is a schematic isometric view of an exemplary keyboard according to a first embodiment.
Figure 2:
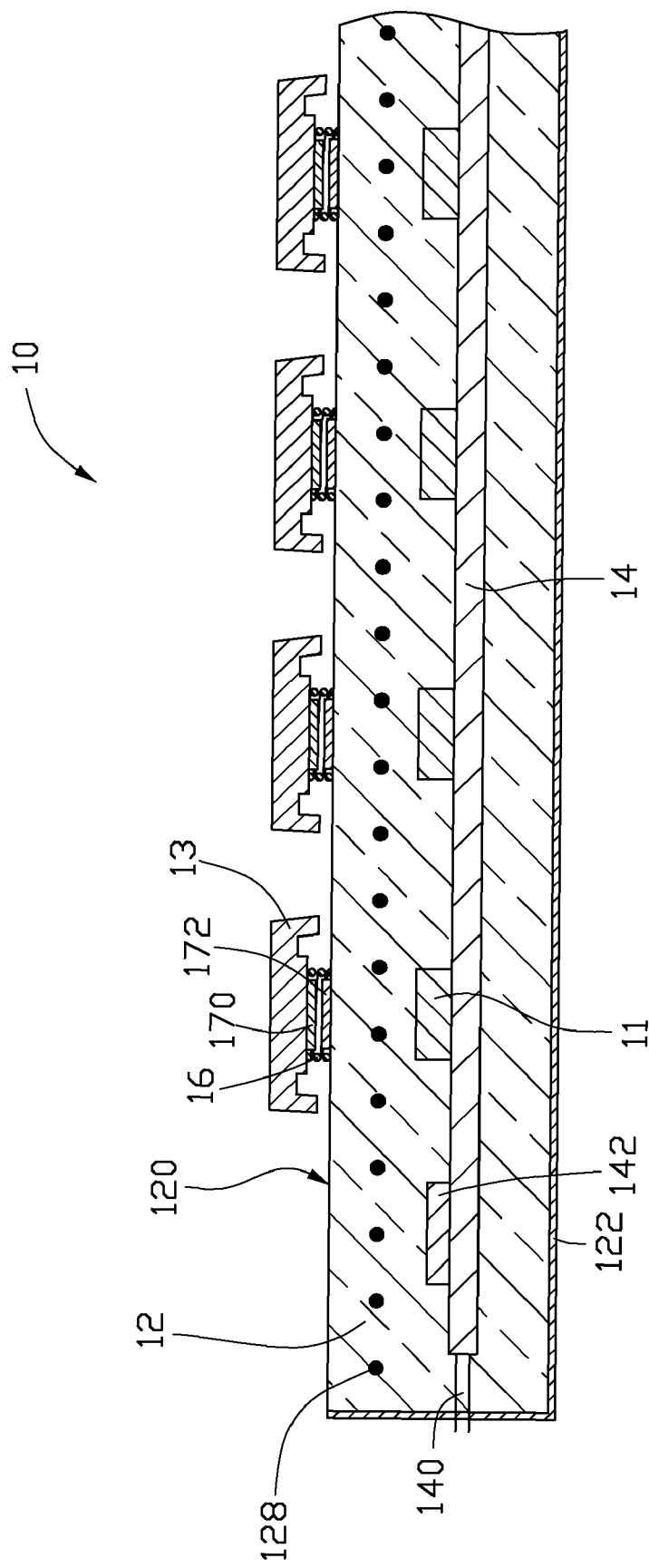
FIG. 2 is a cross-sectional view taken along line II-II of FIG. 1.

Referring to FIGS. 1 and 2, a keyboard 10 in accordance with a first embodiment includes a light pervious panel 12 having a top surface 120, a plurality of input keys 13 on the top surface 120, and at least one of light sources 11 wrapped or encapsulated in the light pervious panel 12.

In the first embodiment, each of the input keys 13 has a top side with alphanumeric symbols printed thereon, and a bottom side facing away from the top side and having a plurality of first conductive tracks 170 (e.g., silver ink) printed thereon. The top surface 120 of the light pervious panel 12 also has a plurality of second conductive tracks 172 printed thereon. The second conductive tracks 172 are aligned with the first conductive tracks 170. A support mechanism 16 (e.g., coil spring) is arranged between each of the input keys 13 and the top surface 120 of the light pervious panel 12 and configured for connecting the input keys 13 with the light pervious panel 12.

When the input key 13 is pressed, the coil spring 16 is depressed, and the first conductive tracks 170 press against the second conductive tracks 172 to form a complete circuit. When an input key 13 is pressed and the circuit is completed, a code is generated and sent to the computer either via a keyboard cable (not shown) or over a wireless connection. The input keys 13 of FIG. 1 may be arranged in a variety of patterns.

The input keys 13 are typically arranged in conventional patterns of alphanumeric and other symbols, as found with most personal computers, to guide the user in providing appropriate input via the keyboard 10.

To facilitate illumination of the keyboard 10, and specifically input keys 13, at least one part of each input key 13 comprises a light transfer portion to permit passage of light transmitting therethrough from the light pervious panel 12. The light transfer portion can be the entire input key 13 or just the portions where the symbols are located. In one example, the input keys 13 are made out of a translucent material or a light pervious material. Transparent acrylonitrile butadiene styrene (ABS) plastic is an example of such material. In this embodiment, the light transfer portion defines the entire input key 13. In another example, the outer surfaces of translucent input keys 13 are made out of an opaque material and the light transfer portion of this opaque material is etched so that it transmits light. The etched portion can be patterned to define the symbols on each of the strike surface. Another potential arrangement includes placement of opaque symbols in the input keys 13 which is formed of a translucent material to allow transmission of light around the symbols.

The at least one of light sources 11 may includes a plurality of light emitting diodes (LEDs). The LEDs are commercially available in a variety of colors such as white, yellow, blue, and green. In the first embodiment, the plurality of light sources 11 is electrically mounted on a circuit board 14. The circuit board 14 can be a print circuit board (PCB), a flexible PCB, a metal core PCB, a thin film PCB, etc. The circuit board 14 includes an electrical connector 140 coupled to a power source (not shown) for powering the light sources 11, and a control circuit 142 for controlling the intensity of the light sources 11. The power source may be a battery or the power source of keyboard 10. A variety of methods, devices, and circuitry for controlling the intensity of the light sources 11 will readily be recognized by persons of ordinary skill in the art.

The light pervious panel 12 can be made out of glass, plastic, or other suitable light pervious materials. In the first embodiment, the material of the light pervious panel 12 is selected from the group consisting of polymethyl methacrylate (PMMA), polycarbonate (PC), and silicon. The material of the light pervious panel 12 can further comprise a plurality of light diffusers 128 for diffusing light beams emitted from the light sources 11, and a plurality of micro structures (not shown) can be defined in the top surface 120 of the light pervious panel for the same purpose. The material of the light pervious panel also can further comprise optical transition materials, such as phosphors, dyes.

The light sources 11 are encapsulated or wrapped in the light pervious panel 12 by an injection molding process or a hot embossing process. As such, the light sources 11 are integral components of the light pervious panel 12 and optically coupled to the light pervious panel 12. The injection molding process can help keep air bubbles from forming in the final part of the light pervious panel 12, thereby enhancing efficiency of light transmission thereof. Furthermore, a reflect film 122 can be formed on outer surface of the light pervious panel 12 except for the top surface 120.

Figure 3:
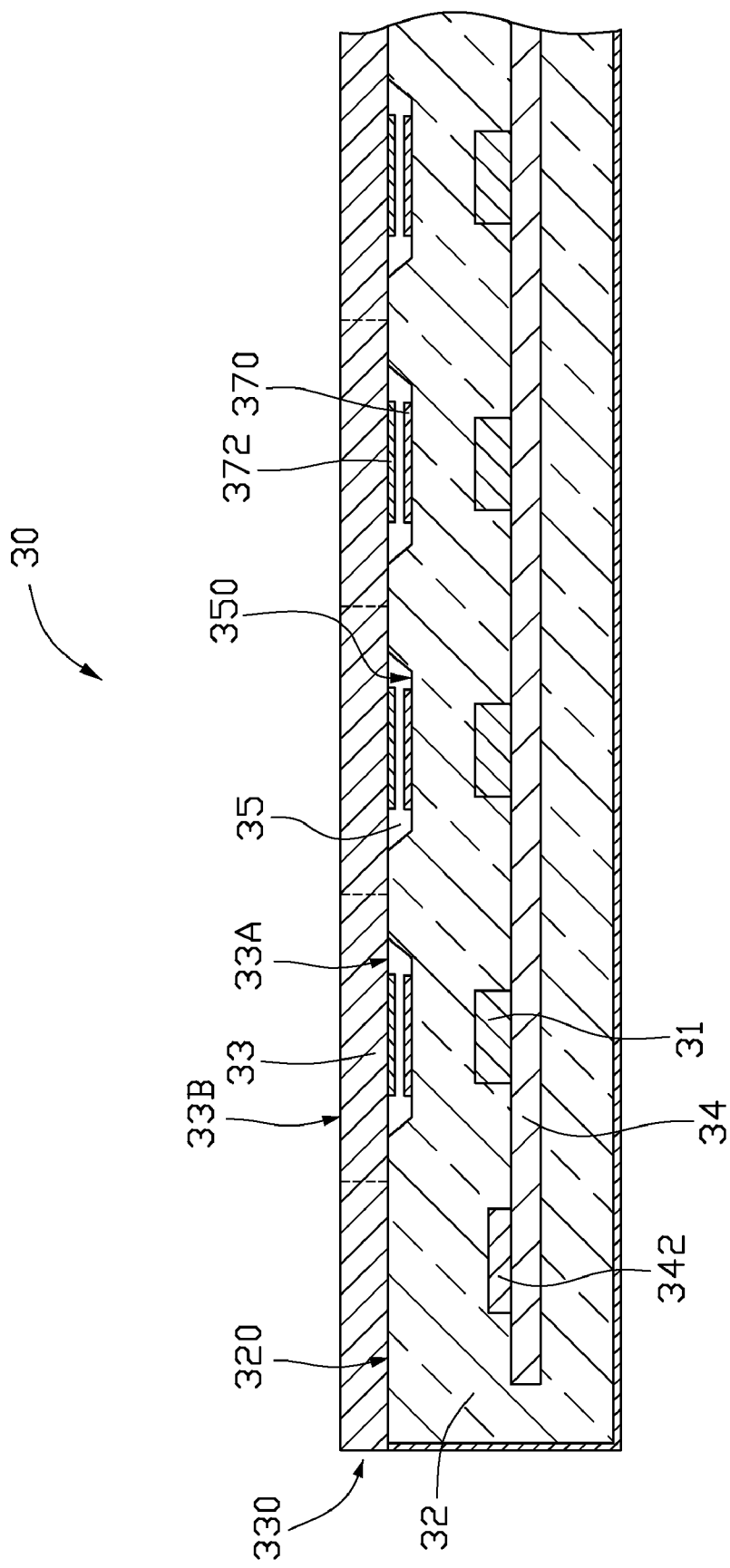
FIG. 3 is a cross-sectional view of an exemplary keyboard according to a second embodiment.

Referring to FIG. 3, a keyboard 30 in accordance with a second embodiment includes a light pervious keyboard membrane 330, light pervious panel 32 having a top surface 320, and at least one of light sources 31 wrapped or encapsulated in the light pervious panel 32.

In the second embodiment, the keyboard membrane 330 is made out of soft plastic, or other suitable material that is light pervious and flexible. The keyboard membrane 330 having a top surface 33B with alphanumeric symbols (not shown) printed thereon, and a bottom surface 33A facing away from the top surface 33B and having a plurality of first conductive tracks 372 (e.g., silver ink) printed thereon. The keyboard membrane 330 is divided into a plurality of key portions 33 corresponding to alphanumeric symbols.

A plurality of recesses 35 are defined in the top surface 320. The recesses 35 are aligned with the first conductive tracks 372 printed on the keyboard membrane 330. The bottom surface 350 of each recess 35 is printed with a plurality of second conductive tracks 370 (e.g., silver inks) thereon. Through the recesses 35, the first conductive tracks 372 of the keyboard membrane 330 may contact the corresponding second conductive tracks 370 on the light pervious panel 32, when the key portions 33 are pressed.

The structures of the light pervious panel 32 and the light sources 31 are similar with that of the light pervious panel 12 and the light sources 11 in the first embodiment. The difference is that the circuit board 34 includes a solar cell battery 342 coupled thereto and encapsulated in the light pervious panel 32. The solar cell battery 342 is configured for driving the light sources 31. The keyboard membrane 330 can be integrally formed with the light pervious panel 32 as a single body. As such, the keyboard 30 can be fully immersed in water, making them popular in hospitals and laboratories, as they can be disinfected.

It is to be understood, however, that even though numerous characteristics and advantages of various embodiments have been set forth in the foregoing description together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A keyboard comprising:
    a light pervious panel having a top surface;
    a plurality of input keys disposed on the light pervious panel with bottom sides of the input keys facing the top surface of the light pervious panel;
    at least one light source encapsulated in the light pervious panel and optically coupled to the light pervious panel; and
    a circuit board electrically connected with the at least one light source, the circuit board disposed in the light pervious panel.

2. The keyboard of claim 1, wherein the at least one light source comprises a plurality of light emitting diodes.

3. The keyboard of claim 1, wherein the circuit board comprises an electrical connector for coupling to an external power source.

4. The keyboard of claim 1, further comprising a battery electrically connected with the circuit board for powering the light source, the battery disposed in the light pervious panel.

5. The keyboard of claim 4, wherein the battery comprises a solar cell battery.

6. The keyboard of claim 1, wherein the light pervious base plate panel is comprised of glass or plastic.

7. The keyboard of claim 6, wherein the material of the light pervious panel is selected from the group consisting of polymethyl methacrylate, polycarbonate, and silicon.

8. The keyboard of claim 6, wherein the material of the light pervious panel comprises a plurality of light diffusers for diffusing light beams emitted from the at least one light source.

9. A keyboard comprising:
    a light pervious keyboard membrane having a bottom surface, a plurality of first electrical contacts formed on the bottom surface;
    a light pervious panel having a top surface facing the bottom surface of the light pervious keyboard, a plurality of recesses defined in the top surface of the light pervious panel and aligned with the first electrical contacts, a second electrical contact printed on each bottom surface of the corresponding recess; and
    at least one light source encapsulated in the light pervious panel and optically coupled to the light pervious panel.

10. The keyboard of claim 9, wherein the light pervious keyboard membrane is integrally formed with the light pervious panel as a single body.

11. The keyboard of claim 10, further comprising a circuit board electrically connected with the light sources, the circuit board encapsulated in the light pervious panel.

12. The keyboard of claim 11, further comprising a battery electrically connected with the circuit board for powering the light source, the battery encapsulated in the light pervious panel.

13. The keyboard of claim 12, wherein the battery comprises a solar cell battery.

14. The keyboard of claim 9, wherein the light pervious panel is comprised of glass or plastic.

15. The keyboard of claim 14, wherein the material of the light pervious panel is selected from the group consisting of polymethyl methacrylate, polycarbonate, and silicon.

16. The keyboard of claim 15, wherein the material of the light pervious panel comprises a plurality of light diffusers for diffusing light beams emitted from the at least one light source.

17. A keyboard comprising:
    a light pervious panel having a top surface;
    a plurality of input keys disposed on the light pervious panel with bottom sides of the input keys facing the top surface of the light pervious panel; and
    at least one light source encapsulated in the light pervious panel and optically coupled to the light pervious panel;
    wherein the light pervious panel is comprised of glass or plastic; and
    wherein the material of the light pervious panel comprises a plurality of light diffusers for diffusing light beams emitted from the at least one light source.

* * * * *